United States Patent
Li

(10) Patent No.: US 12,425,556 B2
(45) Date of Patent: Sep. 23, 2025

(54) LEARNING-BASED LIGHT FIELD COMPRESSION FOR TENSOR DISPLAY

(71) Applicant: Adeia Guides Inc., San Jose, CA (US)

(72) Inventor: Zhu Li, Overland Park, KS (US)

(73) Assignee: Adeia Guides Inc., San Jose, CA (US)

( * ) Notice: Subject to any disclaimer, the term of this patent is extended or adjusted under 35 U.S.C. 154(b) by 295 days.

(21) Appl. No.: 17/727,970

(22) Filed: Apr. 25, 2022

(65) Prior Publication Data

US 2023/0344974 A1 Oct. 26, 2023

(51) Int. Cl.
*H04N 13/122* (2018.01)
*H04N 13/161* (2018.01)
*H04N 13/388* (2018.01)

(52) U.S. Cl.
CPC ......... *H04N 13/122* (2018.05); *H04N 13/161* (2018.05); *H04N 13/388* (2018.05)

(58) Field of Classification Search
CPC .. H04N 13/122; H04N 13/161; H04N 13/302; H04N 13/32; H04N 13/351; H04N 13/388; H04N 13/232; G06N 3/0464; G06N 3/08
USPC ......................................................... 348/43
See application file for complete search history.

(56) References Cited

U.S. PATENT DOCUMENTS

2023/0106939 A1* 4/2023 Yuan ..................... G06T 3/4046
382/154

OTHER PUBLICATIONS

Maruyama et al. K. Maruyama, Y. Inagaki, K. Takahashi, T. Fujii and H. Nagahara, "A 3-D Display Pipeline from Coded-Aperture Camera to Tensor Light-Field Display Through CNN," 2019 IEEE International Conference on Image Processing (ICIP), Taipei, Taiwan, 2019, pp. 1064-1068, doi: 10.1109/ICIP.2019.880 (Year: 2019).*
Y. Wang et al., "Light Field Image Super-Resolution Using Deformable Convolution," in IEEE Transactions on Image Processing, vol. 30, pp. 1057-1071, 2021, doi: 10.1109/TIP.2020.3042059 (Year: 2021).*
Bross et al., "Developments in International Video Coding Standardization After AVC, With an Overview of Versatile Video Coding (VVC)", Proceedings of the IEEE, 109(9):1463-1493 (2021).
Hedayati et al., "Light Field Compression by Residual CNN Assisted JPEG", IJCNN, pp. 1-13 (2021).

(Continued)

*Primary Examiner* — Christopher S Kelley
*Assistant Examiner* — Ana Picon-Feliciano
(74) *Attorney, Agent, or Firm* — HALEY GUILIANO LLP

(57) ABSTRACT

Systems, methods and apparatuses are described herein for training a machine learning model to accept as input synthetic aperture image (SAI) training data for a three-dimensional (3D) display, the 3D display comprising a plurality of layers. The machine learning model may be trained to output respective pixel representations of the SAI training data for each of the plurality of layers of the 3D display. The provided systems, methods and apparatuses may access image data, input the image data to the trained machine learning model, and determine, using the trained machine learning model, respective pixel representations of the input image data for each of the plurality of layers of the 3D display. The provided systems, methods and apparatuses may encode the respective pixel representations of the input image data, and transmit, for display at the 3D display, the encoded respective pixel representations of the input image data.

20 Claims, 8 Drawing Sheets

(56) References Cited

OTHER PUBLICATIONS

Li et al., "Light Field and Plenoptic Point Cloud Compression," Springer: Handbook for Dynamic Data Driven Applications Systems, pp. 199-226 (2021).
Li et al., "Pseudo Sequence Based 2-D Hierarchical Coding Structure for Light-Field Image Compression", IEEE Journal of Selected Topics in Signal Processing, 11(7):1107-1119 (2017).
Li et al., "Quadtree-based Coding Framework for High Density Camera Array Based Light Field Image," IEEE Trans on Circuits and Systems for Video Technology, pp. 1-16 (2019).
Wang et al., "Salience Guided Depth Calibration for Perceptually Optimized Light Field 3D Display," Proc. CVPR, 2031-2040 (2018).
Wetzstein et al., "Tensor Displays: Compressive Light Field Synthesis using Multilayer Displays with Directional Backlighting," ACM Trans. Graph. 31(4) 80:1-80.11 (2012).
Zhao et al., "Light Field Image Compression Based on Deep Learning," Proc of IEEE ICME, pp. 1-6 (2018).

* cited by examiner

LEARNING-BASED LIGHT FIELD COMPRESSION FOR TENSOR DISPLAY

BACKGROUND

This disclosure is directed to systems and methods for encoding image data for a three-dimensional (3D) display. In particular, the 3D display may comprise multiple layers, and respective pixel representations of image data for each of the layers of the display, output by a trained machine learning model, may be obtained, encoded and transmitted for display.

SUMMARY

With recent advances in display technology, image sensor technology and computation, particularly graphics processing units (GPUs), as well as increasing interest in immersive virtual experiences, the long-pursued concept of light field displays is becoming a more active area of commercial development. Light field (LF) is a three-dimensional (3D) capture solution that directly records four-dimensional (4D) plenoptic visual signals for immersive visual communication and interaction. Tensor display-based presentation of the LF utilizes multiple display layers in a multiplicative display scheme and allows for glasses-free 3D display.

Due to the highly redundant nature of the LF, the data volume generated is extremely large (e.g., including many high-resolution views) for storage and communication of LF data. In one approach, LF compression schemes employ a sequence-based compression of Synthetic Aperture Image (SAI)-based presentation of the LF, i.e., compressing the SAI itself. In such an approach, for a 17×17 SAI, 169 pieces of information need to be encoded, which is inefficient and sub-optimal for a tensor display-based presentation of LF data. In another approach, a least-squares algorithm is utilized to compress LF data for a tensor display. However, simply employing such least-squares algorithm in isolation results in relatively poor pixel estimates for multi-layer displays.

To overcome these drawbacks, apparatuses, systems and methods are provided herein for training a machine learning model to accept, as input SAI training data for a 3D display, the 3D display comprising a plurality of layers, and output respective pixel representations of the SAI training data for each of the plurality of layers of the 3D display. The provided systems and methods may input image data to the trained machine learning model, and determine, using the trained machine learning model, respective pixel representations of the input image data for each of the plurality of layers of the 3D display. The provided systems and methods may encode the respective pixel representations of the input image data, and transmit, for display at the 3D display, the encoded respective pixel representations of the input image data.

Such improved computer-implemented techniques increase the efficiency of the encoding and/or compression of image data for a multi-layer 3D display by encoding pixel layer representations directly aligned with the properties of a multi-layer 3D display, e.g., to facilitate multi-layer display-based LF presentation and interaction (e.g., at an LF tensor display). For example, the provided systems and methods may employ one or more machine learning models in a deep learning-based modeling and compression scheme, to enable\directly optimizing layers of the display and learning compact pixel layer representations for achieving compression and/or encoding efficiently. Such computer-implemented techniques may utilize layered representations and a deep learning network, including feature learning and embedding with deformable convolution, to significantly reduce the computing and/or network resources used to perform storage and/or transmission of the LF data.

In some embodiments, the 3D display is an LF tensor display, and the SAI training data comprises LF information and represents respective view angles of a plurality of view angles of a frame of a media asset.

In some aspects of this disclosure, training the machine learning model further comprises obtaining, using a least-squares solver, an initial estimate for the respective pixel representations for each of the plurality of layers, determining a loss function based on the initial estimate, and adjusting one or more parameters of the model to minimize the loss function.

In some embodiments, the machine learning model is a deep learning deformable SAI feature embedding network comprising a deformable feature extraction block comprising a convolution layer and a deformable layer and a residual learning block. In some embodiments, the residual learning block may be configured to undergo residual learning based at least in part on the initial estimate determined by the least-squares solver.

In some aspects of this disclosure, training the machine learning model further comprises causing the machine learning model to learn, using the deformable convolution layer and for each feature map of a plurality of feature maps representing characteristics of respective pixels of the SAI training data, filter weights for a filter and an offset mask for the filter. In some embodiments, the learned offset mask enables flexible selection of input feature map pixels.

In some aspects of this disclosure, the filter is configured to be slid around, and convolved with, pixels of the SAI training data at a plurality of sampling positions, and the offset mask is configured to deform the plurality of sampling positions.

In some embodiments, the offset mask is fractional, and the deformable convolution layer is configured to perform bilinear interpolation to estimate pixel values of the deformed sampling positions.

In some aspects of this disclosure, a second layer of the 3D display is disposed between a first layer of the 3D display and a third layer of the 3D display, and is spaced apart from the first layer and the third layer, and the first layer is disposed between a backlight of the 3D display and the second layer, and is spaced apart from the backlight and the second layer. A distance between the third layer and the backlight may be greater than a distance between the second layer and the backlight, and the distance between the second layer and the backlight may be greater than a distance between the first layer and the backlight.

In some embodiments, the encoding further comprises applying Versatile Video Coding (VVC) intra coding to the respective pixel representations of the input image data determined by the trained machine learning model.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
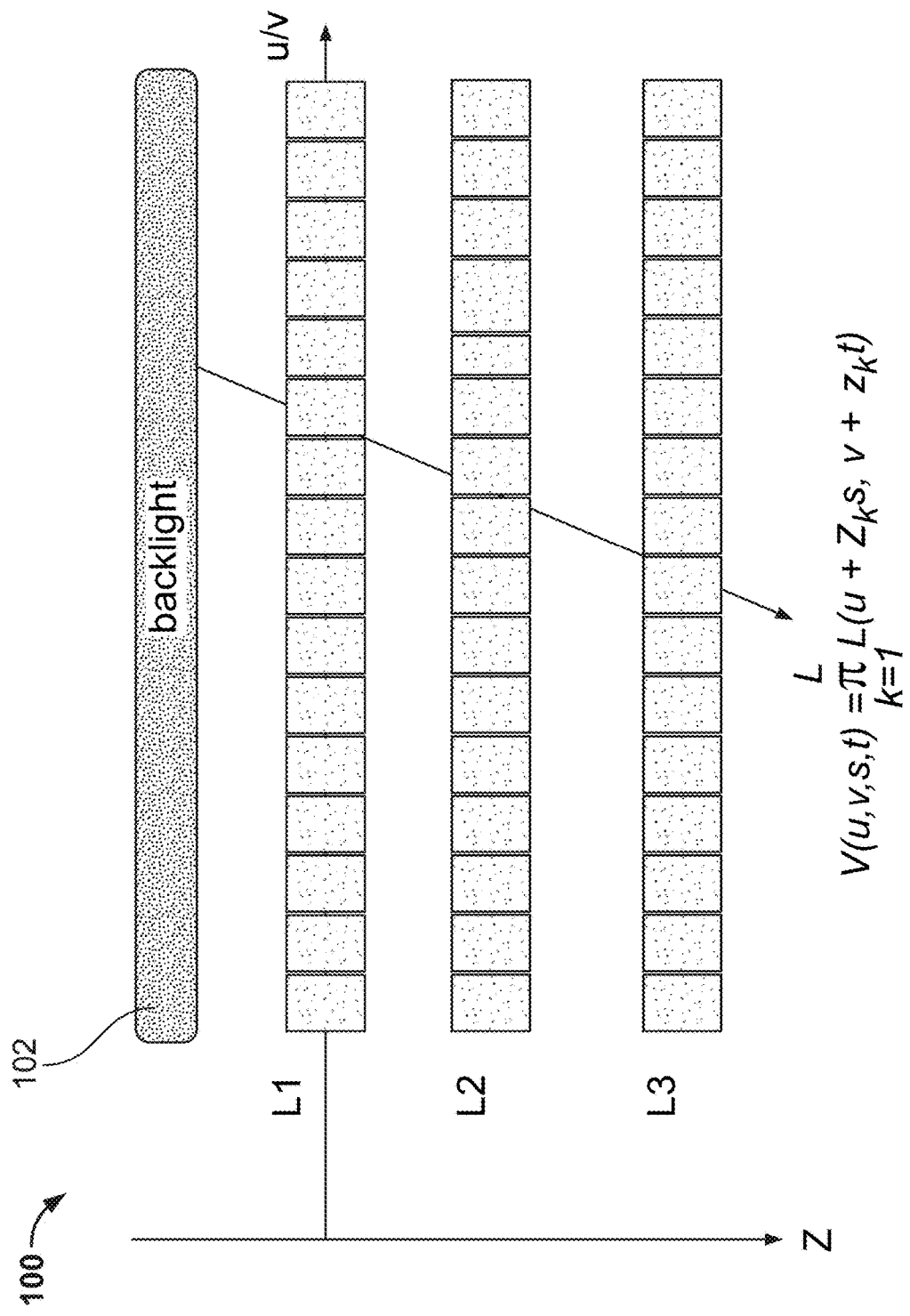
FIG. 1 shows an illustrative multi-layer 3D display, in accordance with some embodiments of this disclosure.

FIG. 1 shows an illustrative multi-layer 3D display 100, in accordance with some embodiments of this disclosure. In some embodiments, 3D display 100 be a multi-layer display comprising any suitable number of layers. In some embodiments, 3D display 100 may be a multi-layer light field (LF) display, such as, for example, an LF tensor display, or any other suitable multi-layer 3D display, or any combination thereof. A tensor display may be understood as a display that utilizes a plurality of layers in a multiplicative display scheme (and/or any other suitable scheme) and is capable of displaying 3D content. For example, the tensor display may include any suitable number of back-lit stacked liquid crystal display (LCD) panels arranged layered at different depths, and may be capable of presenting imagery with different view angles. In the example of FIG. 1, each of the layers (far layer L3, middle layer L2 and near layer L1), or a subset thereof, may comprise a respective pixel representation, where the imagery perceived by one or more users viewing 3D display 100 may be a multiplication (or additive or any other suitable combination) of pixel values of each of the layers, or a subset thereof. In some embodiments, a user may perceive a time average of imagery displayed by the multiple layers of 3D display 100. In some embodiments, one or more of the layers may comprise or otherwise be part of an integral display, or a modular display in which a display is built from modular elements that tile together. Tensor displays are discussed in more detail in Wetzstein et al., "Tensor Displays: Compressive Light Field Synthesis using Multilayer Displays with Directional Backlighting," ACM Trans. Graph. 31 (4): 80:1-80:11 (2012), the contents of which are hereby incorporated by reference herein in their entirety.

3D display 100 may comprise layers L1, L2, and L3 and backlight 102, where first layer L1 may be disposed between and spaced apart from second layer L2 and backlight 102, and second layer L2 may be disposed between and spaced apart from third layer L3 and first layer L1. A distance between third layer L3 and backlight 102 may be greater than a distance between second layer L2 and backlight 102, and the distance between second layer L2 and backlight 102 may be greater than a distance between first layer L1 and backlight 102. 3D display 100 may comprise any suitable uniform or directional backlight system (e.g., a light-emitting diode lighting system and/or any other suitable backlighting) and any suitable rendering medium (e.g., liquid crystal layers, plasma layers, or any other suitable layers, or any combination thereof). In some embodiments, 3D display 100 may be capable of providing a 3D viewing experience to the user with or without the aid of an additional device, e.g., glasses equipped with temporal shutters, polarizers, color filters, or other optical or optoelectronic elements. In some embodiments, 3D display 100 may be configured to display holograms or holographic structures. In some embodiments, 3D display 100 may access image data over any suitable data interface (e.g., HDMI, DisplayPort, or any other suitable interface, or any combination thereof) over which image data may be received, e.g., from memory and/or over a network and/or any other suitable source.

LF or plenoptic images may represent a scene as a collection of observations of the scene from different camera positions, often referred to as elemental images or parallax views. LF imagery may be captured with a single image sensor and a lenslet array or a single camera on a moving gantry, and/or larger scenes may be captured with a 2D camera array, and/or an array camera or plenoptic camera, or any other suitable device, or any combination thereof. Synthetic content such as from a 3D model or game engine may be rendered with a virtual camera in an array of positions to create the same sort of representation. The LF imagery or image data may correspond to an SAI, which may be understood as images from all possible view angles of a particular scene or image. For example, each of the images of the SAI may be a respective full-scale image of a particular view angle. 3D display 100 may be configured to be capable of reconstructing every possible view and perspective of the content. The SAI may be comprised of two-dimensional (2D) images.

An LF display may be understood as a display configured such that as the user moves his or her head and/or his or her eyes and/or his or her body to view the LF display from different angles or vantage points, the one or more images provided via the LF display may appear to the user to shift in perspective according to the perception angle of the new vantage point. This may give the user the impression that the object is actually present, thus making the user perceive the image as three-dimensional. For example, a user's perspective may shift if the user physically pans from left to right with respect to 3D display 100, or otherwise modifies his or her viewing location, or if a user manipulates or shifts a device comprising 3D display 100 relative to him- or herself, or any combination thereof). Such views or perspectives may be 2D, and a plurality of the views may together make up a single frame of a media asset, as discussed in more detail below. In some embodiments, the frame may comprise a plurality of views corresponding to a single instance in time, e.g., captured images of a particular real-world scene and/or computer-generated images of a particular scene. In some embodiments, pixel values of LF imagery may be a function of a location of the user and viewing angle of the user.

In some embodiments, the LF information may be used to generate a plurality of views of a particular frame, for use by 3D display 100 to display a particular scene of a media asset, which may comprise any suitable number of frames associated with respective views or perspectives. In some embodiments, the plurality of views may respectively correspond to different perspectives of a scene, e.g., a degree or less apart, or any other suitable degrees of separation between the views may be employed. As referred to herein, the terms "media asset" and "content" may be understood to mean electronically consumable user assets, such as television programming, as well as pay-per-view programs, on-demand programs (as in video-on-demand (VOD) systems), Internet content (e.g., streaming content, downloadable content, webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. In some embodiments, 3D display 100 may be configured to enable a user to modify the focus of different objects depicted in the media asset in a particular scene and/or while the media asset is progressing, e.g., in a foveated display. In some embodiments, each view may be understood as a bitmap, e.g., comprising bits representing values of brightness, color and directionality of light rays associated with the image data of the view.

The 2D views may be horizontal-parallax-only (in which the view perceived by the user changes only as the user's perspective changes from side to side); vertical-parallax-only (in which the view perceived by the user changes only as the user's perspective changes in an upwards or downwards direction); of a full parallax view (in which the view changes as the user's perspective shifts up and down and/or side to side); or any other suitable arrangement may be employed, or any combination thereof. Imagery displayed by 3D display 100 may be generated based on image data (e.g., one or more images and/or video) captured with an image sensor and a lenslet array, or a 2D camera array, or may be a multiview rendering of synthetic content such as from a 3D model (e.g., a CGI model) or game engine rendered with a virtual camera in an array of positions, or may be captured or generated using any other suitable electro-optic or opto-electronic mechanism, or any other suitable methodology, or any combination thereof. Such imagery may facilitate a realistic 3D viewing experience to the user using any suitable number of 2D views. In some embodiments, a single image sensor and lenslet array and/or the 2D camera array may be configured to capture a plurality of different 2D parallax views of a scene, to enable reconstruction of the scene by 3D display 100 from every angle of the scene. For example, the image sensor may be a CCD or CMOS image sensor, or any other suitable sensor or combination thereof, and the lenslet or camera array may correspond to a plenoptic content capture device, or any other suitable content capture devices or cameras, or any combination thereof, which may each comprise internal microlens arrays and image sensors. Plenoptic content capture devices are discussed in more detail in U.S. Pat. No. 9,384,424 issued in the name of Rovi Guides, Inc. on Jul. 5, 2016, the contents of which are hereby incorporated by reference herein in their entirety.

LF information comprising all light rays or photons propagating from an object to a camera may be captured. Such LF information is four-dimensional, and may be represented by a vector comprising intensity information, spatial positioning information, and directionality and angular information of light rays of the LF. In some embodiments, light rays from a particular portion of the captured scene may project to a particular portion of the lenslet array (e.g., via a main lens of the camera) and/or corresponding portions or pixels of an image sensor (e.g., positioned behind the lenslet array). Such features may enable preserving orientation and direction information of the light rays arriving at the sensor, in addition to color and brightness information, for use in reconstructing the image data at 3D display 100. In some embodiments, each pixel of 3D display 100 may be associated with color and brightness values, and may be configured to be perceived differently in different angular directions, e.g., left, right, up, down, etc., based on the orientation and direction information.

As shown in FIG. 1, any light ray V (u, v, s, t,) may be considered a multiplication of color attributes captured on the three layers L1, L2, L3, where (u, v) is the pixel location, (s, t) is the angular offset, and the solution for pixel values for layers L1, L2, L3 (e.g., layered LCD panels) may be computed using equation (1), the least-square (LS) algorithm, shown below:

$$\min_{L_k(u,v)} \sum_{u,v,s,t} \left\| \prod_k L_k(u + z_k s, v + z_k t) - U(u, v, s, t) \right\|^2 \quad (1)$$

A more efficient way of representing LF for multi-layer 3D display purposes, e.g., a tensor display (or any other suitable multi-layer display or any combination thereof) may take into consideration attributes of the layered LCD panels. The apparatuses, systems and methods provided for herein may implement an image data processing system (e.g., implemented at one or more of media content source 602, server 604, database 605, or 3D display device 615 of FIG. 6, or any combination thereof, or distributed across one or more of any other suitable computational resources, or any combination thereof). Such image data processing system may be configured to implement techniques based at least in part on the unique configuration of multi-layered 3D displays, e.g., the arrangement of a tensor LF display. For example, the provided apparatuses, systems and methods may efficiently compress and/or encode the layered display field of L=3 (or any other suitable number of layers). This may be performed as an alternative to compressing an SAI of m×m views and solving equation (1) at display time, such as where m may be relatively large, such as 13 or 17. In some embodiments, system 200 may facilitate effective pixel prediction to enable implementing efficient compression of image data.

Figure 2:
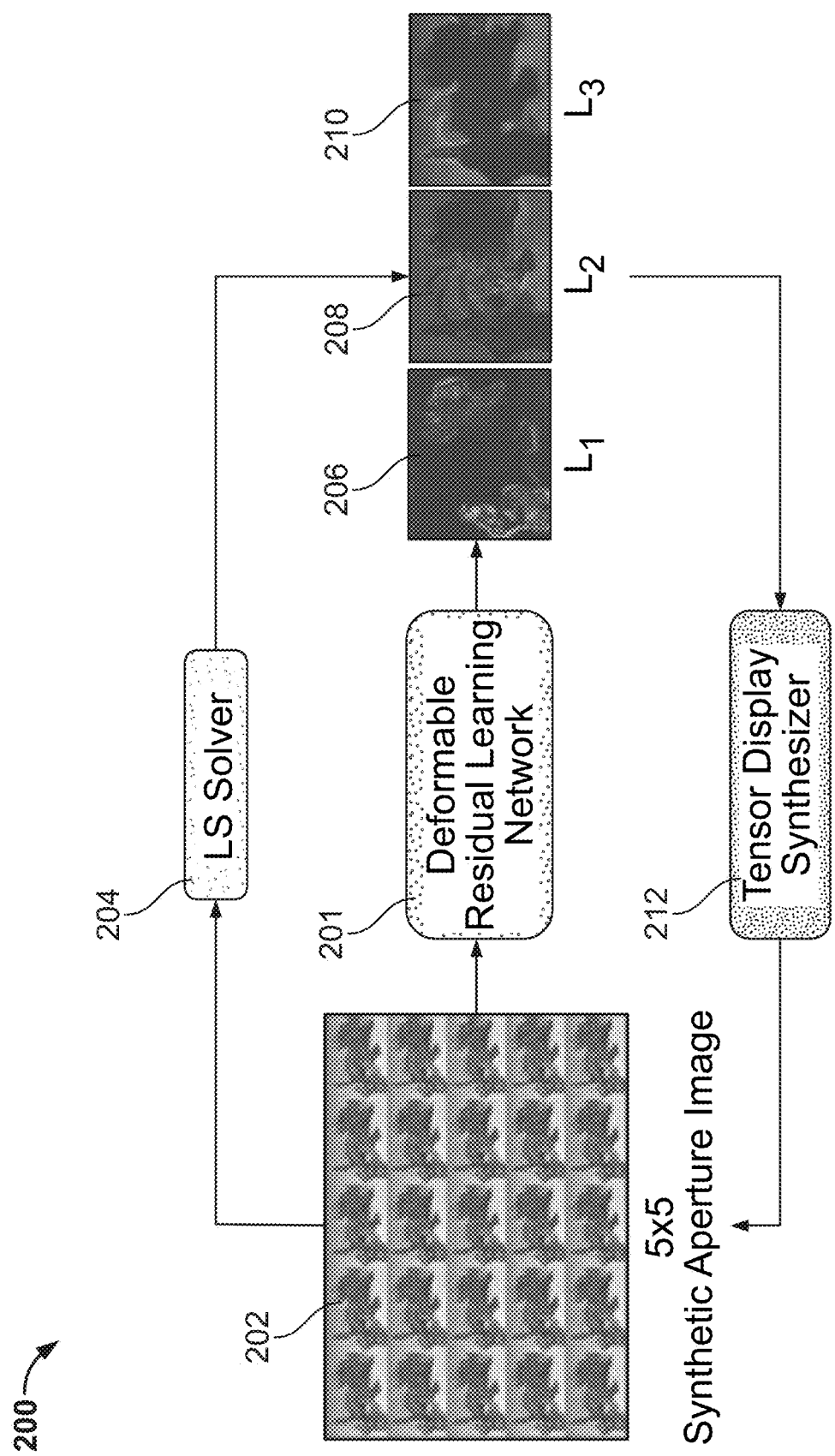
FIG. 2 shows an illustrative block diagram for training a machine learning model to process image data for a multi-layer 3D display, in accordance with some embodiments of this disclosure.

FIG. 2 shows an illustrative block diagram of a system 200 for training machine learning model 201 to process image data for a multi-layer 3D display, in accordance with some embodiments of this disclosure. In some embodiments, system 200 may employ a multi-layer display (e.g., tensor display LCD layer) color attributes compression scheme. System 200 may implement any suitable set of computer-implemented instructions for predicting pixel value layer representations for a multi-layer display. In some embodiments, system 200 may implement one or more of any suitable type of machine learning model and/or one or more of multiple different types of machine learning model or any other suitable algorithms. Model 201 may be trained to accept as input training image data (e.g., an SAI) for 3D display 100 comprising a plurality of layers (e.g., layers L1, L2, L3 of FIG. 1), and which can be trained to output respective pixel representations 206, 208, 210 of the training image data for each of the plurality of layers of the 3D display. For example, once model 201 is trained, model 201 may take as input image data corresponding to an SAI having any suitable number of views, and output respective pixel values for each layer of 3D display 100 enabling the layers of 3D display to present imagery corresponding to the SAI.

In some embodiments, model 201 may be a deformable residual learning network. Model 201 and its associated parameters and settings may be stored and executed by the image data processing system locally (e.g., at 3D display 100) and/or at one or more remote devices (e.g., server 604 and/or media content source 602). Training image datasets used to train model 201 may be stored locally (e.g., at 3D display 100) and/or at one or more remote devices (e.g., server 604 and/or media content source 602). In some embodiments, the SAI may correspond to any suitable natural captured image, e.g., a low fidelity or high fidelity image such as, for example, with 17×17 view angles, and/or computer-generated imagery may be employed for training.

The image data processing system may be configured to encode and/or compress the pixel layer representations of the input image data, as output by the trained machine learning model, for the multiple layers (e.g., L1, L2, L3 of FIG. 1). Such encoded layer pixel representations may be stored and/or transmitted for display at a 3D display device (e.g., a tensor LF display or any suitable multi-layer display). Such receiving 3D display device decodes the received image data and generates content for display, based on the decoded image data corresponding to the pixel representations of the input image data for the multiple layers (e.g., L1, L2, L3 of FIG. 1), to facilitate an LF user experience of a media asset for one or more users. In some embodiments, model 201 may be configured to perform at least a portion of the encoding, and/or may be configured to transmit the output pixel representations for the input image data for the multiple layers to another suitable computing resource (e.g., a Versatile Video Coding (VVC) encoder, or any other suitable encoding tool, or any combination thereof) to perform encoding.

In some embodiments, during training of model 201, for an input LF represented as an m×m SAI 202, a least-squares solution may be computed (by way of LS solver 204 using equation (1) above) and used as an initial estimation of the layered display $L_k(u, v)$. The estimate generated by LS solver 204 may depend at least in part on respective distances between the display layers L1, L2, L3 of 3D display 100 and/or distances between backlight 102 and one or more of such display layers L1, L2, L3. While LS solver 204 is shown in FIG. 2, the image data processing system may additionally or alternatively employ any suitable algorithm, component or technique to obtain such initial estimate. Such initial estimate can be projected back to the image data processing system via a bottom branch (e.g., via tensor display synthesizer 212), to enable the image data processing system to compute a loss for m×m views, based on a peak signal-to-noise ratio (PSNR), and/or any other suitable metric. Such computed loss may be used to drive machine learning model 201 during training, e.g., using a middle branch to update parameters (e.g., weights and/or bias values and/or other internal logic of the model) to minimize the loss function. Such feedback may contribute to improving the pixel representations output by model 201 and ultimately improve the quality of the layer representations to be transmitted to 3D display 100. Model 201 may be trained to predict and fill in pixel values associated with gaps in pixel representation quality for the various layers of the display. For example, the initial estimate output by LS solver 204 may be a relatively poor estimate of the layered pixel representation, and model 201 may be trained to supplement and improve upon such initial estimate. In some embodiments, the loss function used to drive model 201 may be given as L1 distortion between SAI ground truth and synthesized LF views at SAI angular resolutions, as shown below in equation (2):

$$L = \sum_{s,t} \|SAI(u, v, s, t) - V(u, v, s, t)\| \qquad (2)$$

Model 201 may be trained with any suitable amount of training image data, e.g., various SAIs and/or other image data having any suitable various numbers of views, from any suitable number and types of sources. In some embodiments, known natural capture SAI images may be utilized as training data, and/or synthetic images generated by a synthetic engine. The image data processing system may perform any suitable pre-processing steps with respect to training image data and/or image data to be input to the trained machine learning model (e.g., extracting suitable features from the training SAIs, converting the features into a suitable numerical representation (e.g., one or more vector(s) and/or one or more matrices) normalization, resizing, minimization, brightening the image or portions thereof, darkening the image or portions thereof, color shifting the image among color schemes, from color to grayscale, or other mapping, cropping the image, scaling the image, adjusting an aspect ratio of the image, adjusting contrast of an image, and/or performing any other suitable operating on or manipulating the image data, or any combination thereof). In some embodiments, the image data processing system may pre-process image data to be input to the trained machine learning model, to cause a format of the input image data to match the formatting of the SAI training data, or any other suitable processing, or any combination thereof.

In some embodiments, machine learning model 201 may be trained by way of unsupervised learning, e.g., to recognize and learn patterns based on unlabeled data. Additionally or alternatively, machine learning model 201 may be supervised and trained with labeled training examples to help the model converge to an acceptable error range. In some embodiments, the training image data may be suitably formatted and/or labeled (e.g., with identities of various attributes and/or pixel values, by human annotators or editors or otherwise labeled via a computer-implemented process). As an example, image pairs may be input, e.g., an initial estimate for layer representations of a training image (such as determined by LS solver 204) and actual layer representations (e.g., annotated or input by a user and/or otherwise received as categorized metadata attributes in conjunction with or appended to the training image data). This may enable model 201 to be trained to learn the differences between the initial estimate and the actual layer representations for the training image data, and learn residual corrections that should be made with respect to the image pairs over any suitable number of training cycles.

Model 201 may receive as input a vector, or any other suitable numerical representation, representing SAI feature embeddings and process such input. For example, model 201 may be trained to learn features and patterns with respect to characteristics of a particular input SAI and corresponding high-quality output layered representations of the input. Such learned inferences and patterns may be applied to received data once model 201 is trained. In some embodiments, model 201 is trained at an initial training stage, e.g., offline. In some embodiments, model 201 may continue to be trained on the fly or may be adjusted on the fly for continuous improvement, based on input data and inferences or patterns drawn from the input data, and/or based on comparisons after a particular number of cycles. In some embodiments, model 201 may be content independent or content dependent, e.g., may continuously improve with respect to certain types of content.

Figure 3:
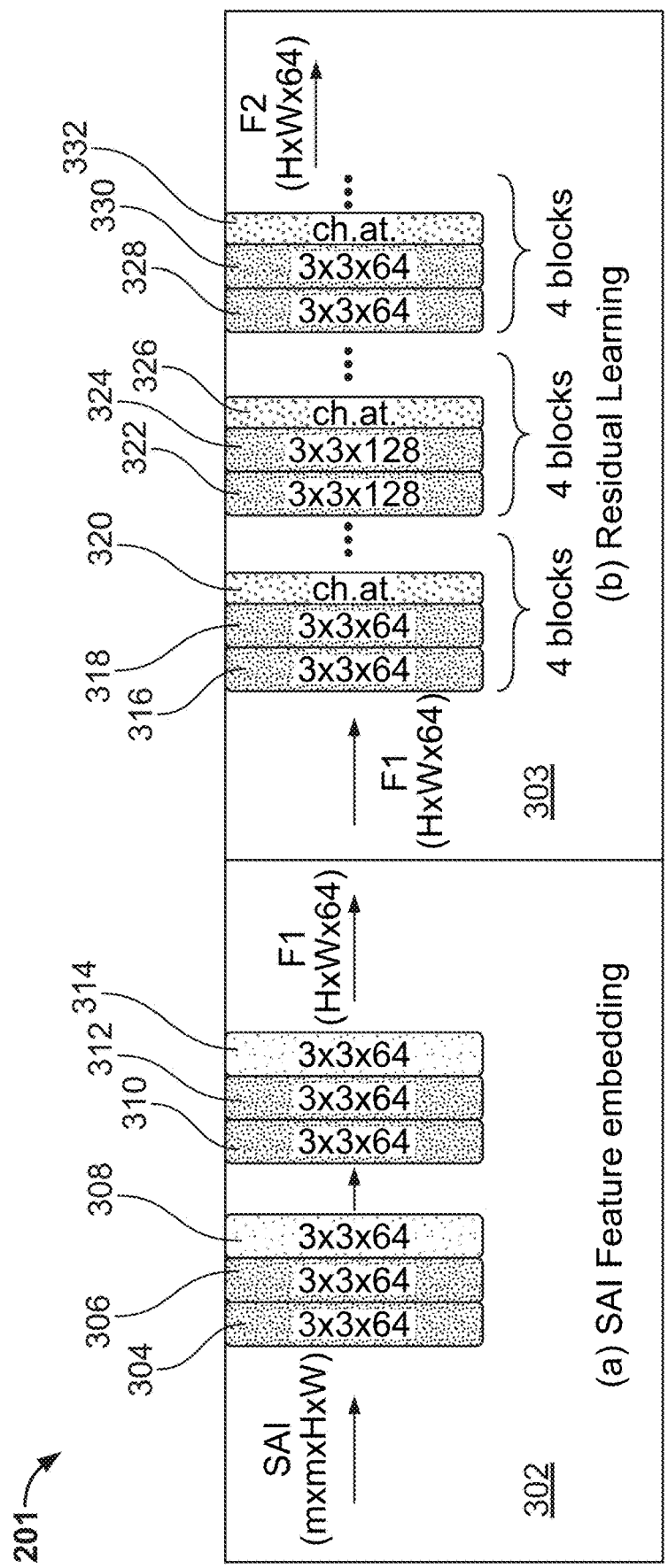
FIG. 3 shows an illustrative block diagram of a machine learning model configured to process image data for a multi-layer 3D display, in accordance with some embodiments of this disclosure.

FIG. 3 shows an illustrative block diagram of machine learning model 201 configured to process image data for a multi-layer 3D display, in accordance with some embodiments of this disclosure. In some embodiments, machine learning model 201 may be a deep learning deformable SAI feature embedding network (DSAIFE). In some embodiments, model 201 may comprise a deformable feature extraction block 302 and/or a residual learning block 303 and/or any other suitable blocks (e.g., comprising one or more layers and/or one or more groups of layers and/or other components). In some embodiments, machine learning model 201 may be a deep learning-based segmentation model, e.g., a neural network machine learning model, a recurrent neural network, or any other suitable model, or any combination thereof. The model may have any suitable number and types of inputs and outputs and any suitable number and types of layers (e.g., input, output, and hidden layer(s)). In some embodiments, machine learning model 201 may be a convolutional neural network (CNN) machine learning model having any suitable number and types of inputs and outputs and any suitable number and types of layers (e.g., input, output, and hidden layer(s)). Any suitable network training patch size and batch size may be employed for model 201. As a non-limiting example, a network training patch size of 64×64 pixels may be selected, and a batch size of 16 may be selected.

A CNN may leverage the observation that neighboring or adjacent pixels in a particular image tend to be similar to each other, e.g., tend to be of a similar color or the same color, and/or tend to be of a similar texture or the same texture, and/or otherwise have similar characteristics. The CNN model may be used to extract features from input images and automatically learn suitable weights during training by employing any suitable number of convolution layers that can apply one or more filters to input images (e.g., 3×3 pixels, or a filter, kernel or mask of any other suitable dimensions). Such filter may be smaller than the input image. In some embodiments, a weight or intensity of the pixels of the filter may be learned and optimized, e.g., during training via backpropagation, after initially employing random weights or intensities for the filter. The filter may be moved or slid around the image and overlaid on different pixel groupings of the input image and convolved with overlapping pixels. An output of such filtering may correspond to a feature map in which each portion corresponds to a grouping of pixels of the input image. In some embodiments, a bias value may be applied to a filter output and/or feature map. In some embodiments, pooling may be applied to the feature map, e.g., to select a maximum or average value in each region of the feature map for input to a next layer of the network, rather than inputting values for each individual pixel of a training image. In some embodiments, an activation function (e.g., of the convolution layer, a hidden layer or any other suitable layer) may be applied to the feature map, e.g., prior to performing pooling. The CNN may be trained to output predictions or likelihoods of particular pixel values for each respective layer of a multi-layer 3D display.

In some embodiments, deformable feature extraction block 302 may be an SAI feature extraction module comprising any suitable number of blocks (e.g., two blocks, or any other suitable number of blocks) of convolution and deformable feature learning. Deformable feature extraction block 302 may comprise a first block including layers 304, 306 and 308, and a second block including layers 310, 312 and 314, where each of layer 308 and 314 may be a deformable convolution layer. Deformable feature extraction block 302 may comprise any suitable number of layers and/or blocks of layers and/or convolution layers and/or deformable convolution layers and/or nodes per layer and/or node properties. As a non-limiting example, deformable feature extraction block 302 may comprise 8 layers (or each of the first block and second block of deformable feature extraction block 302 may comprise 8 layers). In some embodiments, each layer may comprise one or more nodes, which may be associated with learned parameters (e.g., weights and/or biases), and/or connections between nodes may represent parameters (e.g., weights and/or biases) learned during training (e.g., using backpropagation techniques, and/or any other suitable techniques). In some embodiments, the nature of the connections may enable or inhibit certain nodes of the network. In some embodiments, the image data processing system may be configured to receive (e.g., prior to training) user specification of (or automatically select) hyperparameters (e.g., a number of layers and/or nodes or neurons in model 201). The image data processing system may automatically set or receive manual selection of a learning rate, e.g., indicating how quickly parameters should be adjusted.

Deformable feature extraction block 302 may receive as input an SAI (m×m×H×W pixels), e.g., an SAI having 5×5 views and having image height (H) and image width (W) values of 128. In some embodiments, such input may include any suitable number of channels (i.e., feature maps) corresponding to multidimensional representations of characteristics of each pixel of the image data input to deformable feature extraction block 302 and/or such features may be learned at any suitable portion of model 201. Deformable feature extraction block 302 may be configured to output a value (F1) of H×W×number of channels, e.g., 128×128×64, e.g., for each pixel location of image data input to deformable feature extraction block 302, model 201 may learn feature embeddings of 64 dimensions. Such output may subsequently be fed to a next layer and/or block (e.g., the second block including layers 310, 312 and 314) and/or residual learning block 303. The number of channels or feature maps may be set to any suitable number (e.g., 64, 128, 256 or any other suitable number), and/or the number of layers and/or channels may be problem-dependent and flexible. The number of channels or feature dimensions may be selected based on the particular problem size or type of problem that model 201 is addressing, e.g., based on network depths, how wide the network is, how deep the network is, etc.

In some embodiments, one or more filters may be applied to each channel of model 201. In some embodiments, deformable convolution layer 308, 314 may be configured to apply any suitable number of filters. As an example, one or more of convolution layer 308, 314 may be configured to apply 64 filters of size 3×3 within the layer. During training, deformable convolution layer 308, 314 may learn optimal filter weights, as well as an offset mask, as discussed in more detail in connection with FIG. 4. For example, specific filter weights, for any suitable number of filters, may be learned for each channel, and each filter may be used to generate a feature map.

Residual learning block 303 may comprise any suitable number of layers and/or nodes per layer. In some embodiments, each layer may comprise one or more nodes, which may be associated with learned parameters (e.g., weights and/or biases), and/or connections between nodes may represent parameters (e.g., weights and/or biases) learned during training (e.g., using backpropagation techniques, and/or any other suitable techniques). For example, residual learning block 303 may comprise layers 316-332, where layers 320, 326 and 332 may correspond to channel attention layers configured to learn weights over any suitable number of channels (e.g., 64 channels). Residual learning block 303 may receive input F1 via deformable feature extraction block 302. In some embodiments, residual learning block 303 may be trained to learn residual differences between an initial estimate and an actual layered representation of an SAI during training. For example, residual learning block 303 may be trained to adjust one or more parameters of machine learning model 201 to minimize the loss function projected back via tensor display synthesizer 212.

Figure 4:
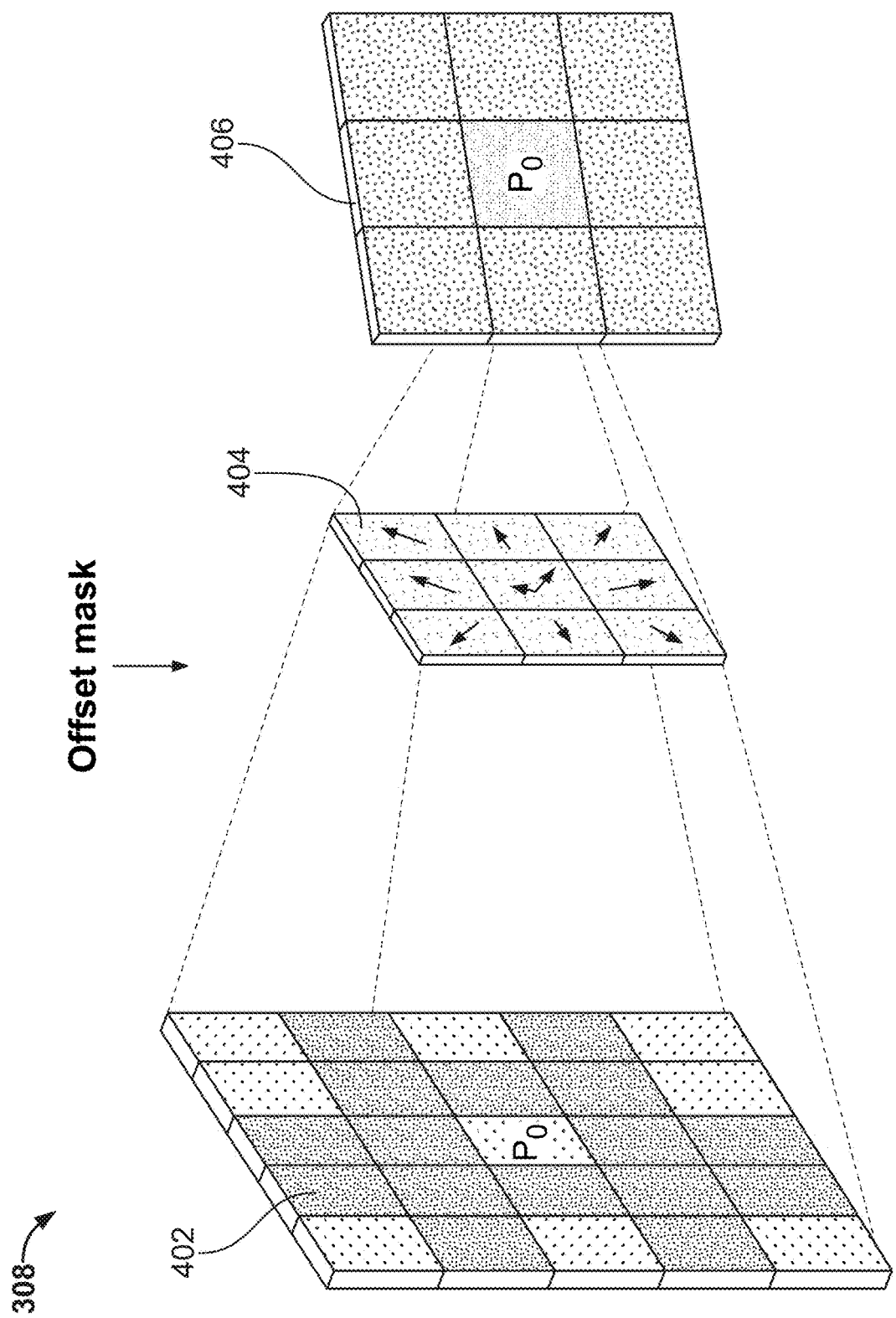
FIG. 4 shows an illustrative deformable convolution layer of a machine learning model configured to process image data for a multi-layer 3D display, in accordance with some embodiments of this disclosure.

FIG. 4 shows an illustrative block diagram of a deformable convolution layer of a machine learning model configured to process image data for a multi-layer 3D display, in accordance with some embodiments of this disclosure. Deformable convolution layer(s) 308, 314 may be implemented to learn weights for offset mask 404, as well as to learn parameters to enable output of offset mask 404 for each input pixel of input feature map 402. For example, instead of using a filter to directly convolve a 3×3 pixel group in input feature map 402, an offset mask 404 having any suitable dimensions (e.g., 3×3×2 or any other suitable dimensions) may be learned, which may allow for flexible selection of input feature map pixels. Such offset masks may be appended to each sampling location to deform or modify the sampling locations employed in a standard CNN, to yield output feature map 406. Deformable convolution layer(s) 308, 314 may modify or deform regions sampled by offset mask 404 to enable processing of and adaption to input image data having a wide range of varying spatial characteristics (e.g., varying and/or transformational with respect to the training dataset). Deformable convolution layer(s) 308, 314 may be used in SAI feature learning to enable sub-pixel view difference modeling. For example, deformable convolution layer(s) 308, 314 may employ bilinear interpolation with respect to a channel or feature map, such as, for example, when the offset is fractional, e.g., to estimate pixel values of deformed sampling positions. In some embodiments, any suitable number of filters, and corresponding offsets, may be learned and employed.

In some embodiments, offset mask 404 may be learned by way of one or more convolutional layers and/or input feature maps. The offset may be, for example, a learned vector, learned by treating an input image as continuous as opposed to a discrete signal. For example, the image data processing system may perform a continuous, bilinear interpolation operation as between pixels to obtain any suitable number of values, e.g., a discrete filter may be convolved with a continuous input sampled at discrete locations. The learned offsets may be useful at least in part based on the observation that adjacent or nearby SAI images tend to be similar to each other, generally having only relatively small differences in similar view angles. Deformable convolution layer(s) 308, 314 may utilize such one or more offset masks to learn such relatively slight differences between layer representations of adjacent or nearby SAI images. Deformable layer 306 of deformable feature extraction block 302 may have, e.g., 64 3×3 filter weights. In some embodiments, any suitable number of filter offsets (e.g., 64 3×3×2 offsets) may additionally be learned. In some embodiments, a depth and width of model 201 may be re-configurable based on a particular training dataset and/or capabilities or characteristics of a particular type of tensor display. As a non-limiting example, a 7×7 SAI may be input to machine learning model 201.

As discussed, model 201 described in FIGS. 2-4 may be trained to accept as input one or more SAIs and output respective pixel representations for layers of 3D display 100, and such pixel representations may be utilized to obtain a high quality reconstruction of SAI at 3D display 100. For example, model 201 may be trained to learn how to categorize portions of input image data that correspond to pixels for a particular layer of a display, and utilize such knowledge to output layered pixel representations. After model 201 is trained, model 201 may output layered representations for new image data unknown to model 201, and may be an accurate predictor of layered representations for input image data. In some embodiments, a display-layer-based compression scheme may be utilized to encode the LF bitstream. In some embodiments, the learned layered representation output by model 201 may be fed into any suitable image coding tool (e.g., VVC intra coding, or any other suitable tool for any other suitable codec, or any combination thereof), which may offer further rate-distortion tradeoffs. Such model 201 can be leveraged to realize significant compression gains.

In some embodiments, the image data processing system may access the image data by receiving the image data over a network (e.g., communication network 606 of FIG. 6 or any other suitable network) from any suitable source (e.g., media content source 602 and/or server 604, or any other suitable data source, or any combination thereof). In some embodiments, the image data processing system may generate the image data, and/or retrieve the image data from memory (e.g., memory or storage 626 or storage 614 or database 505, or any other suitable data store, or any combination thereof) and/or receive the image data over any suitable data interface. In some embodiments, the image data processing system may be configured to access, and/or perform processing on, output or transmit, the image data in response to receiving a user input or a user request, e.g., via user input interface 510 of FIG. 5 and/or I/O circuitry of 3D display device 615 of FIG. 6. In some embodiments, the accessed image data may be in raw form, e.g., as received at server 604 of FIG. 6 or media content source 602 of FIG. 6.

In some embodiments, the image data processing system may perform any suitable processing and/or pre-processing of the layered pixel representation output by model 201 to be transmitted for display to 3D display 100. For example, the image data processing system may be configured to perform compression and/or encoding and/or bit reduction techniques on digital bits of the image data in order to reduce the amount of storage space required to store the image data. Such techniques may reduce the bandwidth or network resources required to transmit the image data over a network or other suitable wireless or wired communication medium and/or enable bit rate savings with respect to downloading or uploading the image data. Such techniques may encode the image data such that the encoded image data may be represented with fewer digital bits than the original representation while minimizing the impact of the encoding or compression on the quality of the video or one or more images.

In some embodiments, such techniques may compress or encode the image data by exploiting the observation that adjacent or nearby portions of the layered pixel representation output by model 201 may have a significant amount of redundancy with respect to each other. For example, such redundancies may be within a pixel representation for a particular layer or across various layers of pixel representation output by model 201. Additionally or alternatively, such encoding techniques may compress the image data to be transmitted to 3D display 100 by exploiting the fact that temporally sequential or nearby frames of the image data may have a significant amount of redundancy with respect to each other.

In some embodiments, the image data processing system may, in performing the encoding and/or compression of the image data, employ a hybrid video coder such as, for example, utilizing the High Efficiency Video Coding (HEVC) H.265 standard, the VVC H.266 standard, the H.264 standard, the H.263 standard, MPEG-4, MPEG-2, or any other suitable codec or standard, or any combination thereof. In some embodiments, in performing the encoding, the image data processing system may take into account an appropriate format of the image data for a particular target device (e.g., a particular type of device and/or of a particular platform or operating system) that is to receive the data, e.g., different versions of the image data may be stored or transcoded on the fly for different types of client devices.

In some embodiments, the image data processing system may be configured to generate a group of pictures (GOP). A GOP may be understood as a set of layered pixel representations at a particular point in time, coded together as a group. Such generating of one or more GOPs may be considered to be part of a process of encoding the image data, or may be considered to be part of a pre-processing step to encoding of the image data. A particular media asset may comprise a plurality of GOPs, each corresponding to a different timepoint within the media asset and/or within the duration of the media asset. For example, each GOP may advance one timepoint with respect to the previous GOP. Each GOP may contain any suitable number of layered pixel representations. The images in a GOP may be encoded using any suitable technique, e.g., differentially or predictively encoded, or any other suitable technique or combination thereof.

In some embodiments, the GOP may include any suitable number of key and predictive portions (e.g., portions of the output layered pixel representations 206, 208, 210), where a key portion may be an I-portion or intra-coded portion that represents a fixed image that is independent of other portions. Predictive portions such as P-portions and B-portions or bi-directionally predictive portions may be employed, which may contain different information indicating distinctions from the reference portion such as the I-portion or another predictive portion. The image data processing system may predict or detect that adjacent or nearby portions within the generated GOP have or may have significant redundancies and similarities across their respective pixel data, and may employ compression and/or encoding techniques that only encode a delta or change of the predictive portions with respect to an I-portions. Such spatial similarities as between portions of the GOP may be exploited to enable certain portions within a GOP to be represented with fewer bits than their original representations, to thereby conserve storage space needed to store the image data and/or network resources needed to transmit the image data. In some embodiments, compression or encoding techniques may be employed within a single portion (e.g., within one of portions of the output layered pixel representations 206, 208, 210), to exploit potential redundancies of image data of nearby or adjacent portions of a particular portion.

Figure 5:
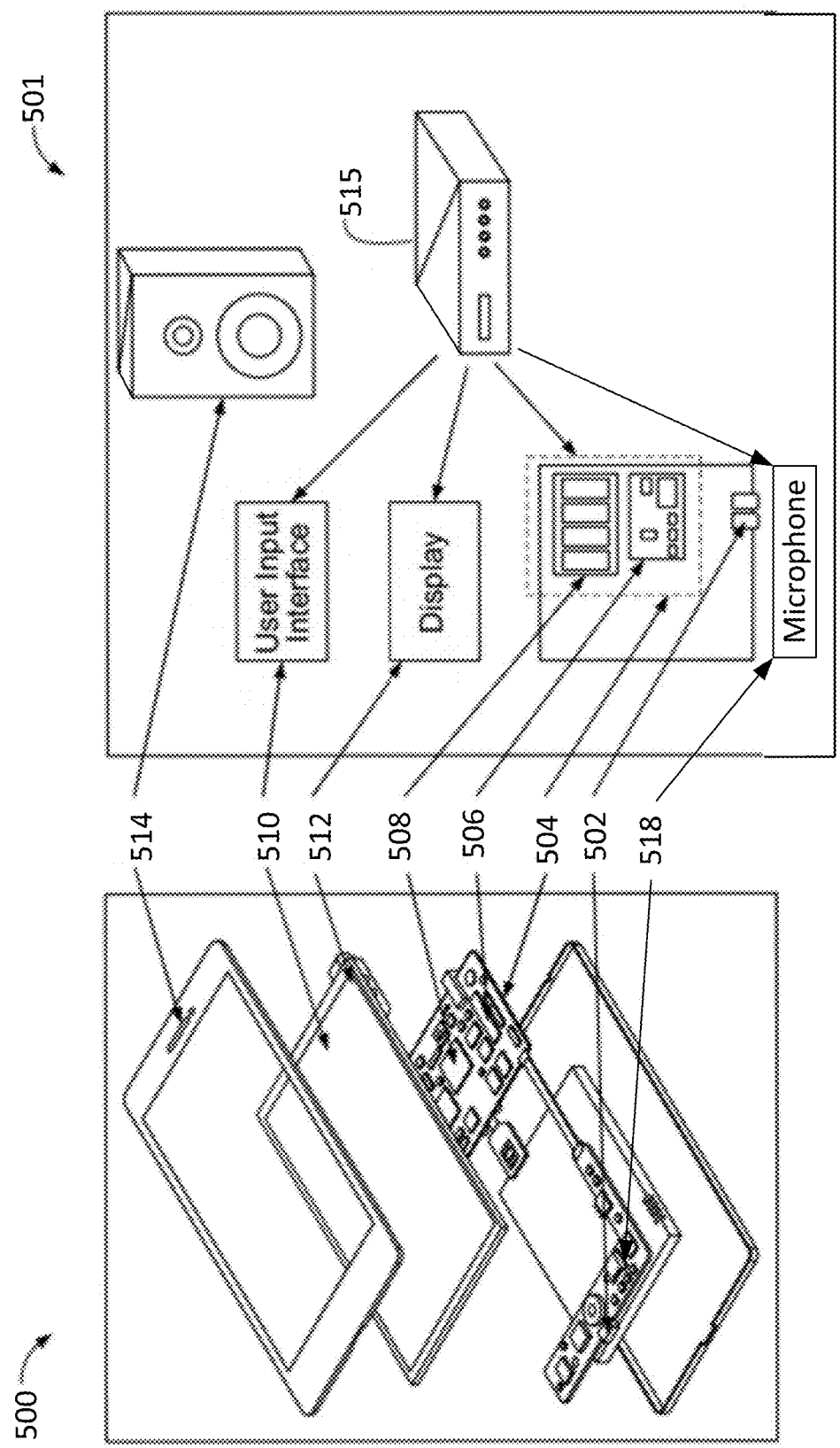
FIGS. 5-6 show illustrative devices and systems for processing image data to be transmitted to a 3D display, in accordance with some embodiments of this disclosure.
Figure 6:
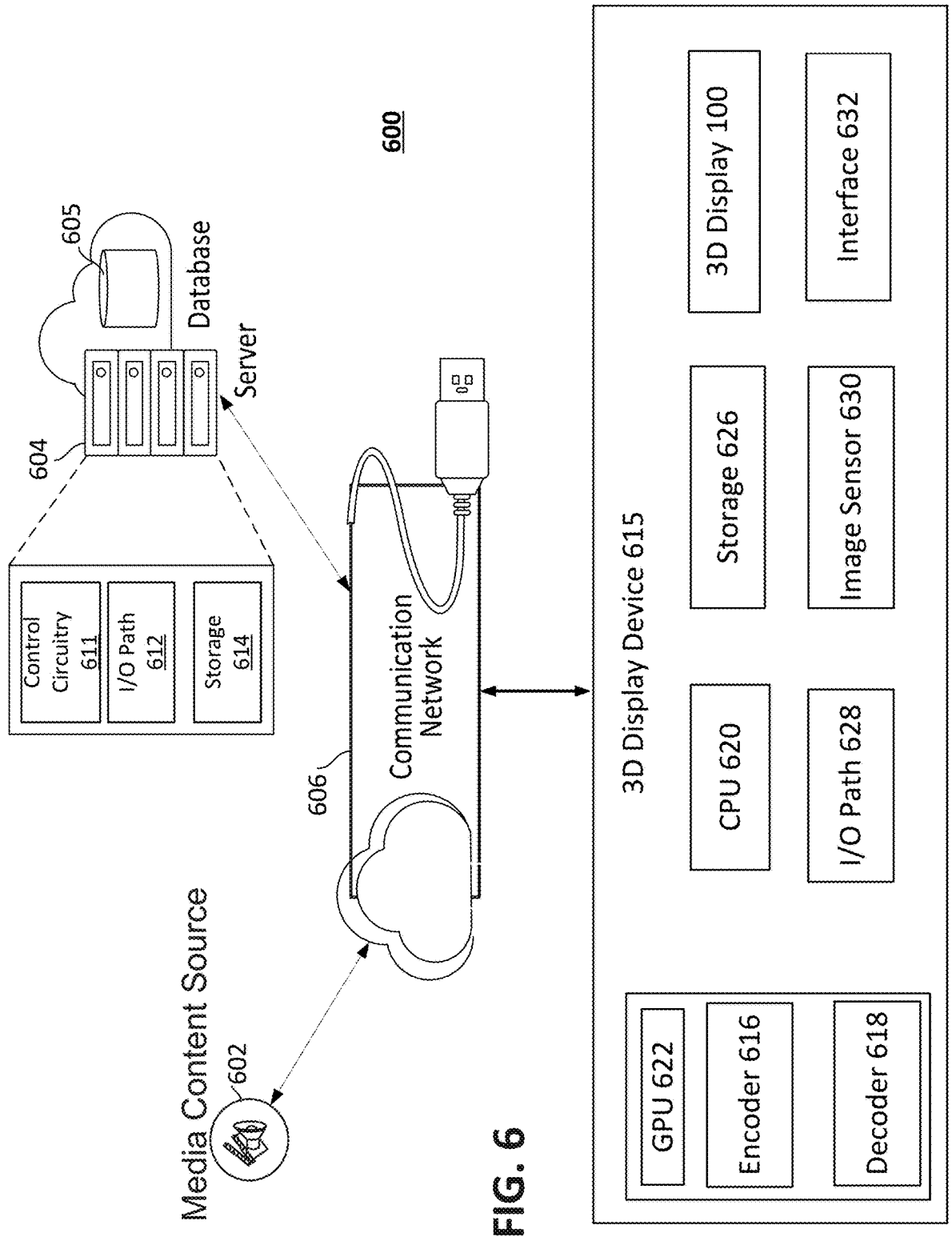

FIGS. 5-6 describe illustrative devices, systems, servers, and related hardware for encoding image data to be transmitted to a 3D display, in accordance with some embodiments of this disclosure. FIG. 5 shows generalized embodiments of illustrative user equipment devices 500 and 501, which may correspond to and/or include, e.g., 3D display 100 of FIG. 1, or any other suitable device, or any combination thereof. For example, user equipment device 500 may be a smartphone device, a tablet, smart glasses, a virtual reality or augmented reality device, or any other suitable device capable of generating for display, and/or displaying, and/or enabling a user to consume, media assets, and capable of transmitting and receiving data, e.g., over a communication network. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. Display 512 may correspond to 3D display of FIG. 1. In some embodiments, microphone 516 may receive audio corresponding to a voice of a user, e.g., a voice command. In some embodiments, display 512 may be a television display or a computer display.

In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 500 and/or device 501 may comprise any suitable number of sensors, as well as a GPS module (e.g., in communication with one or more servers and/or cell towers and/or satellites) to ascertain a location of device 500.

Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), 3D content, LF content, and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., user equipment device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the image data processing system stored in memory (e.g., storage 508). Specifically, control circuitry 504 may be instructed by the image data processing system to perform the functions discussed above and below. In some implementations, processing or actions performed by control circuitry 504 may be based on instructions received from the image data processing system.

In client/server-based embodiments, control circuitry 504 may include communications circuitry suitable for communicating with a server or other networks or servers. The image data processing system may be a stand-alone application implemented on a device or a server. The image data processing system may be implemented as software or a set of executable instructions. The instructions for performing any of the embodiments discussed herein of the image data processing system may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of user equipment 500.

In some embodiments, the image data processing system may be or comprise a client/server application where only the client application resides on user equipment device 500, and a server application resides on an external server (e.g., one or more servers 604 of FIG. 6). For example, the image data processing system may be implemented partially as a client application on control circuitry 504 of user equipment device 500 and partially on server 604 as a server application running on control circuitry 511. Server 604 may be a part of a local area network with one or more of user equipment devices 500, 501 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 604), referred to as "the cloud." User equipment device 500 may be a cloud client that relies on the cloud computing capabilities from server 604 to implement machine learning model 201. When executed by control circuitry 504 or 511, the image data processing system may instruct control circuitry 504 or 611 circuitry to perform processing tasks for the client device and facilitate a media consumption session integrated with social network services. The client application may instruct control circuitry 504 to execute one or more of the systems and methods disclosed herein.

Control circuitry 504 may include communications circuitry suitable for communicating with a server, social network service, a table or database server, or other networks or servers The instructions for carrying out the above mentioned functionality may be stored on a server (which is described in more detail in connection with FIG. 5). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as image data described above. Nonvolatile memory may also be used (e.g., to launch a boot-up routine and other instructions). Cloud-based storage may be used to supplement storage 508 or instead of storage 508.

Control circuitry 504 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to H.265 signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. In some embodiments, display 512 may be any suitable display capable of being implemented as a modular 3D display. In some embodiments, display 512 may comprise one or more of a monitor, a television, a liquid crystal display (LCD) for a mobile device, amorphous silicon display, low-temperature polysilicon display, electronic ink display, electrophoretic display, active matrix display, electro-wetting display, electrofluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of user equipment device 500 and user equipment device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The image data processing system may be implemented using any suitable architecture. For example, it may be a stand-alone application wholly-implemented on each one of user equipment device 500 and user equipment device 501. In such an approach, instructions of the image data processing system may be stored locally (e.g., in storage 508), and data for use by the application may be downloaded on a periodic basis (e.g., from an out-of-band feed, from an Internet resource, or using another suitable approach). Control circuitry 504 may retrieve instructions of the image data processing system from storage 508 and process the instructions to execute machine learning model 201 and/or perform the encoding processes and/or any other techniques discussed herein, and/or provide media consumption and/or social network interaction functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from a social network profile, or any other suitable data, or any combination thereof. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the image data processing system may be a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user equipment device 500. This way, the processing of the instructions is performed remotely by the server while the resulting displays (e.g., that may include text, a keyboard, or other visuals) may be provided locally on user equipment device 500. User equipment device 500 may receive inputs from the user via input interface 510 and transmit those inputs to the remote server for processing and generating the corresponding displays. For example, user equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display may then be transmitted to user equipment device 500 for presentation to the user.

In some embodiments, the image data processing system may be downloaded and interpreted or otherwise run by an interpreter or virtual machine (run by control circuitry 504). In some embodiments, the image data processing system may be encoded in the ETV Binary Interchange Format (EBIF), received by control circuitry 504 as part of a suitable feed, and interpreted by a user agent running on control circuitry 504. For example, the image data processing system may be an EBIF application. In some embodiments, the image data processing system may be defined by a series of JAVA-based files that are received and run by a local virtual machine or other suitable middleware executed by control circuitry 504. In some of such embodiments (e.g., those employing VVC, H.265 or other digital media encoding schemes), the image data processing system may be, for example, encoded and transmitted in a VVC or H.265 object carousel with the VVC or H.265 audio and video packets of a program.

FIG. 6 is a diagram of an illustrative system 600, in accordance with some embodiments of this disclosure. System 600 may comprise one or more of media content source 602, one or more of server 604, one or more of database 605 and one or more of 3D display device 615 (e.g., comprising or otherwise coupled to 3D display 100, or any other suitable device, or any combination thereof), and/or any other suitable components. each of which may be coupled to communication network 606. In some embodiments, 3D display 615 may correspond to user equipment device 500 or user equipment device 501. Communication network 606 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

System 600 may comprise any suitable number of user equipment devices, and such devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606. In some embodiments, the image data processing system may be executed at one or more of control circuitry 611 of server 604 (and/or control circuitry of 3D display device 615 and/or at media content source 602). In some embodiments, any suitable data structure related to image data and/or parallax frames and/or 2D parallax views, may be stored at database 605 maintained at or otherwise associated with server 604, and/or at storage at 3D display device 615.

In some embodiments, server 604 may include control circuitry 611 and storage 614 (e.g., RAM, ROM, hard disk, Removable Disk, etc.). Storage 614 may store one or more databases. Server 604 may also include an input/output (I/O) 612. I/O path 612 may provide media consumption data, social networking data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically processing circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for the image data processing system stored in memory (e.g., the storage 614). Memory may be an electronic storage device provided as storage 614 that is part of control circuitry 611.

Display device 615 may comprise one or more of each of GPU 622, encoder 616, decoder 618, CPU 620, storage 626, 3D display 100, video interface 632, I/O path 628, and image sensor 630. GPU 622 may correspond to a computing processor specially designed to quickly process video signals, and may be implemented as part of a graphics card. In some embodiments, GPU 622 may comprise encoder 616 and/or decoder 618, or encoder 616 and/or decoder 618 may be otherwise separately implemented within or external to 3D display device 615. In some embodiments, server 604 and/or media content source 602 may comprise or be part of a content delivery network (e.g., comprising one or more data centers, and/or edge device), with any suitable number of GPUs, e.g., configured to perform at least a portion of encoding and/or decoding of the image data. For example, 3D display device 615 may receive encoded data locally or over a communication network. In some embodiments, display device 615 may comprise any suitable hardware and/or software configured to perform multiplexing and/or demultiplexing of image data.

Decoder 618 may comprise any suitable combination of hardware and/or software configured to convert data in a coded form to a form that is usable as video signals and/or audio signals or any other suitable type of data signal, or any combination thereof. Encoder 616 may comprise any suitable combination of hardware and/or software configured to process data to reduce storage space required to store the data and/or bandwidth required to transmit the image data, while minimizing the impact of the encoding on the quality of the video or one or more images. Encoder 616 and/or decoder 618 may utilize any suitable algorithms and/or compression standards and/or codecs. In some embodiments, encoder 616 and/or decoder 618 may be a virtual machine that may reside on one or more physical servers that may or may not have specialized hardware, and/or a cloud service may determine how many of these virtual machines to use based on established thresholds. In some embodiments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 616 and/or decoder 618 may be part of, or external to, CPU 620. In some embodiments, encoder 616 and/or decoder 618 may comprise any suitable number of encoders, at a single location or distributed at any suitable number of locations.

CPU 620 may be implemented in a similar manner as control circuitry 504, and storage 626 may be implemented in a similar manner as storage 508. In some embodiments, interface 632 may be any suitable interface configured to transmit video and/or audio data to 3D display 100, and may utilize any suitable multiplexing or demultiplexing technique to combine or separate signals. In some embodiments, decoder 618 may be external to, or comprise part of, 3D display 100. I/O path 628 may be implemented in a similar manner as I/O path 502, and image sensor 630 may be implemented in a similar manner as camera 518. In some embodiments, image sensor 630 may comprise or be implemented as part of a 2D camera array or image sensor and internal microlens arrangement, configured to capture LF information of a scene. In some embodiments, 3D display device 515 may comprise or otherwise be coupled to a synthetic content generator, e.g., as rendered by a 3D model or game engine, to enable 3D display 100 to render LF content with a virtual camera in an array of positions to create the same sort of representation, e.g., to provide a video game experience and/or virtual reality and/or augmented reality experience for a user. 3D display 100 may optionally comprise or otherwise be coupled to a light engine, which may be an array of LEDs and a driver circuit used to illuminate 3D display 100, e.g., an LF display. Any suitable technique and/or components may be used to display parallax views via 3D display 100, e.g., a backlight with multiple display layers, any suitable driver electronics or other displays, etc. The parallax views may be, e.g., real world scenes captured by a camera, or computer generated views or any combination thereof.

Figure 7:
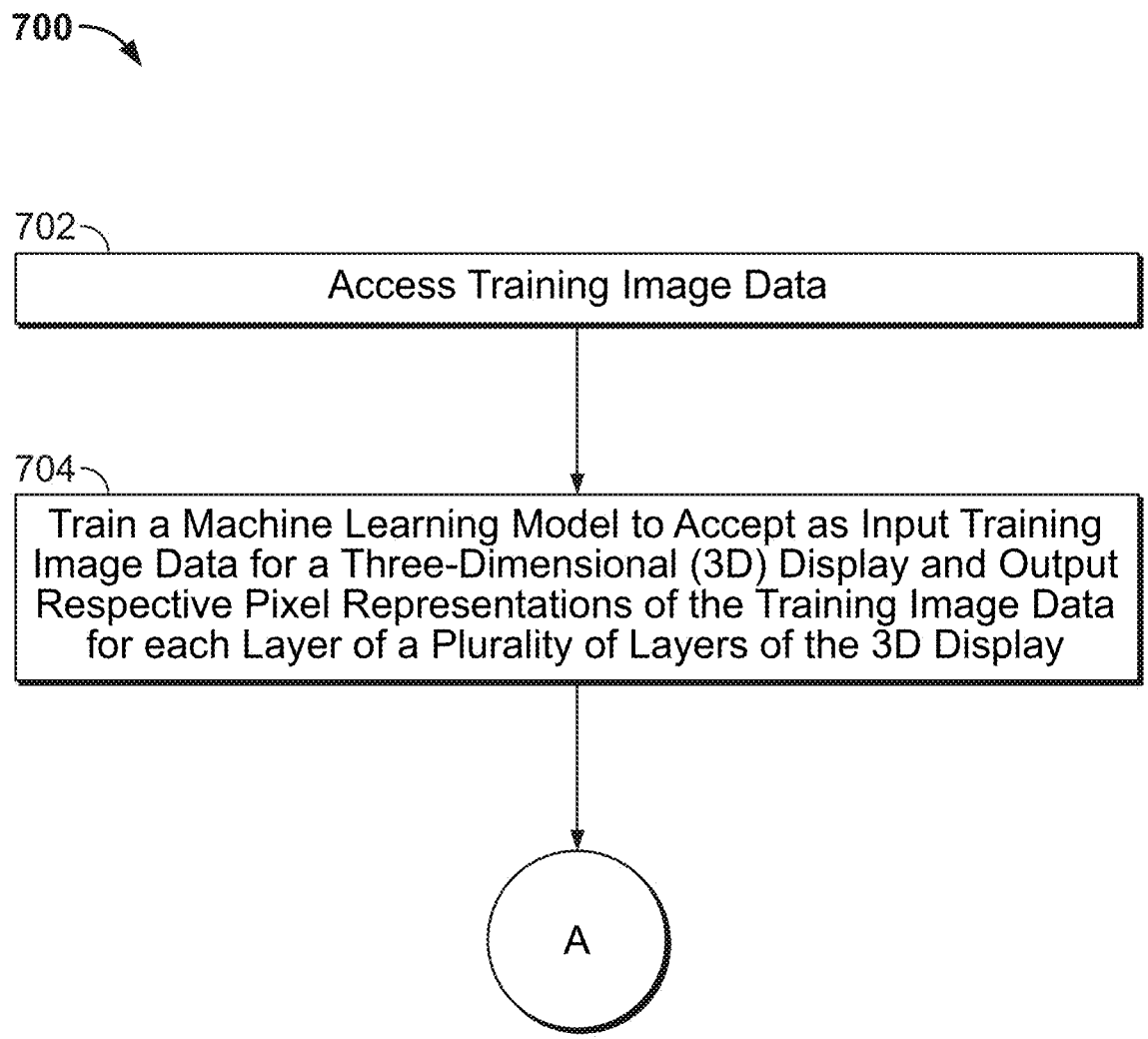
FIG. 7 is a flowchart of a detailed illustrative process for training a machine learning model to process image data for a multi-layer 3D display, in accordance with some embodiments of this disclosure.

FIG. 7 is a flowchart of a detailed illustrative process for training a machine learning model to process image data for a multi-layer 3D display, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead. In addition, one or more steps of process 700 may be incorporated into or combined with one or more steps of any other process or embodiment (e.g., FIG. 8 or any other embodiment disclosed herein, or any combination thereof).

At 702, the image data processing system may access training image data. In some embodiments, the training image data may correspond to any suitable number of SAIs representing LF information, which can be used by a 3D display (e.g., 3D display 100) to facilitate an immersive user consumption experience. Any suitable amount of training image data may be obtained from any suitable source. In some embodiments, any suitable type of pre-processing may be performed on the training image data, to put such data in an optimal form for training a machine learning model (e.g., model 201 of FIG. 2). In some embodiments, the training image data may be labeled, e.g., by human editors or using any other suitable technique. For example, metadata may be appended to, or otherwise stored in association with, the training image data to categorize certain attributes of the data. In some embodiments, certain portions or pixels of SAI training data (e.g., SAI 202) may be labeled as belonging to a pixel representation for a particular layer (e.g., 206, 208, 210 of FIG. 2). In some embodiments, the metadata may otherwise indicate the relationship between attributes of an input SAI image and attributes of the corresponding layered pixel representations. In some embodiments, certain SAI training data may be labeled or otherwise tailored for a particular type of multi-layer display, to enable training of a model to recognize certain patterns with respect to a particular type of multi-layer display (e.g., based on display capabilities and/or a manufacturer and/or any other suitable characteristic). In some embodiments, each SAI may represent respective view angles of a plurality of view angles of a frame of a media asset.

At 704, the image data processing system may train a machine learning model (e.g., model 201 of FIG. 2) to accept as input training image data (e.g., accessed at 702) for a 3D display (e.g., 3D display 100 of FIG. 1) and output respective pixel representations (e.g., 206, 208, 210 of FIG. 2) of the training image data for each of a plurality of layers of the 3D display. In some embodiments, the 3D display may be a tensor display comprising any suitable number of layers and any suitable backlight system. In some embodiments, the machine learning model (e.g., model 201 of FIG. 2) may comprise a deformable feature extraction block 302 of FIG. 3 and/or a residual learning block 303 of FIG. 3 and/or any other suitable blocks (e.g., comprising one or more layers and/or one or more groups of layers and/or other components).

In some embodiments, the image data processing system may train the machine learning model at least in part by obtaining an initial estimate (e.g., via LS solver 204 of FIG. 2) of what the pixel representations for each layer of a 3D display should look like (e.g., 3D display 100) for input image data. The initial estimate may be a relatively poor estimation, and may be fed back (e.g., via tensor display synthesizer 212) to an input of model (e.g., model 201 of FIG. 2), e.g., along with an accurate layered representation of the input image data, which may enable the model to learn the differences between the estimate and the correct representation to make residual corrections. Such corrections may comprise adjusting one or more parameters of the machine learning model to minimize the loss function. Any suitable number of training images and cycles may be employed, to fine tune the machine learning model and help the model converge to an acceptable error range.

In some embodiments, the machine learning model may be a neural network, e.g., a CNN, that employs an offset mask for each filter of the CNN, to be applied to respective input feature maps (e.g., input feature map 402). In some embodiments, each feature map or channel may represent characteristics of respective pixels of the training image data (e.g., SAI 202 of FIG. 2). The machine learning model may be configured to learn filter weights for the filter (e.g., configured to be slid around the training image and convolved with pixels of the training image at various sampling positions) and to learn filter weights for an offset mask for the filter, which may enable flexible selection of input feature map pixels. The offset mask may be employed to deform the plurality of sampling positions, to capture varying spatial characteristics of the training image data. In some embodiments, the offset mask is fractional, and the deformable convolution layer may be configured to perform bilinear interpolation to estimate pixel values of the deformed sampling positions.

Figure 8:
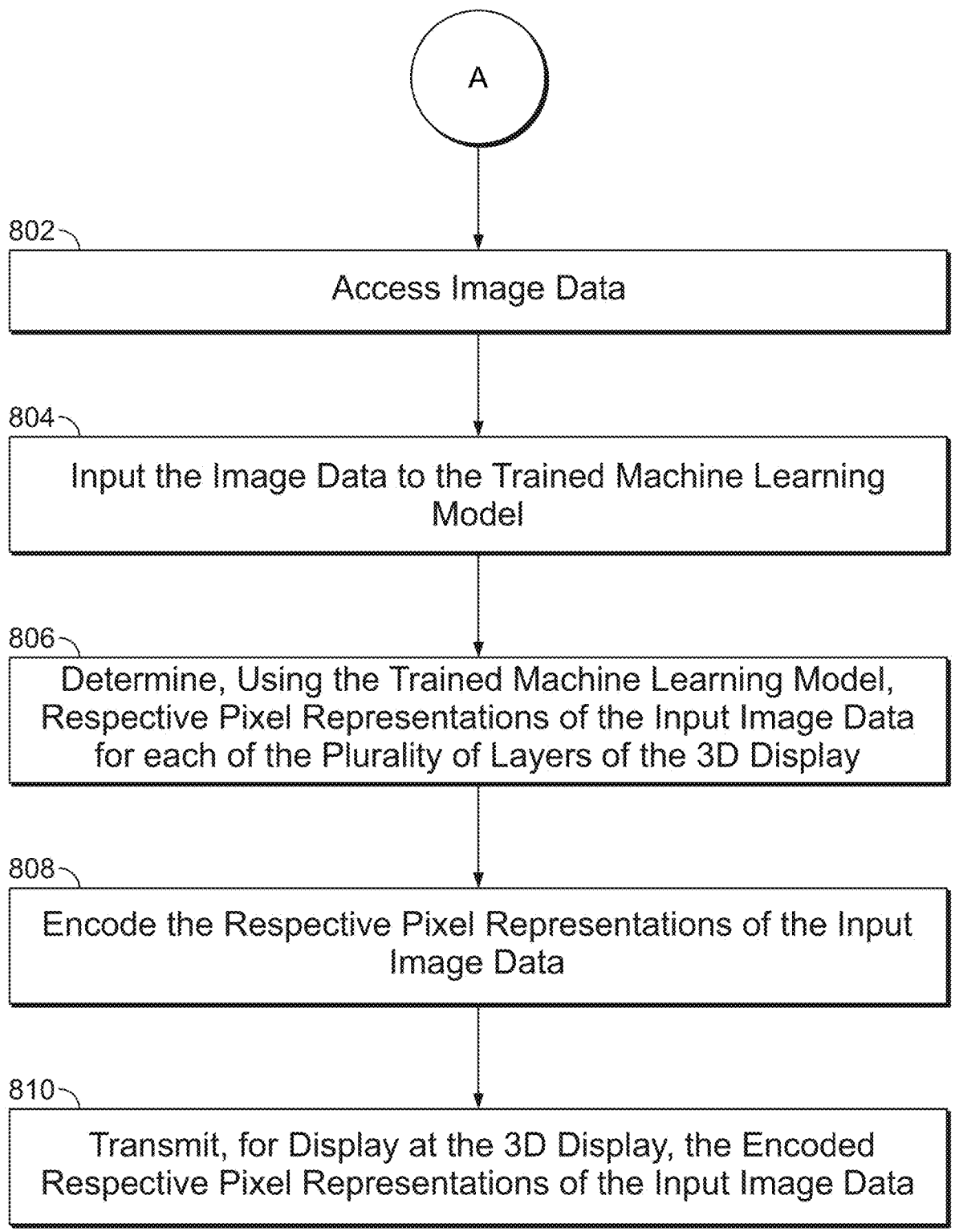
FIG. 8 is a flowchart of a detailed illustrative process for using a trained machine learning model configured to process image data for a multi-layer 3D display, in accordance with some embodiments of this disclosure.

FIG. 8 is a flowchart of a detailed illustrative process for using a trained machine learning model configured to process image data for a multi-layer 3D display, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead. In addition, one or more steps of process 800 may be incorporated into or combined with one or more steps of any other process or embodiment (e.g., FIG. 7, or any other embodiment disclosed herein, or any combination thereof).

At 802, the image data processing system may access image data, e.g., one or more SAIs, which may be associated with a media asset selected by, or otherwise presented to, a user of a 3D display (e.g., 3D display 100 of FIG. 1) for consumption. The image data may correspond to natural capture images and/or synthetic content, and may retrieved from storage (e.g., locally or stored remotely) and/or requested over a network interface.

At 804, the image data processing system may input the accessed image data to the trained machine learning model (e.g., trained in accordance with the techniques discussed in connection with FIG. 7). In some embodiments, the machine learning model 201 may be a deep learning deformable SAI feature embedding network (DSAIFE). In some embodiments, the image data processing system may pre-process image data to be input to the trained machine learning model, to cause a format of the input image data to match the formatting of the SAI training data, or any other suitable processing, or any combination thereof. In some embodiments, the image data may be input to the trained machine learning model as a vector and/or matrix or any other suitable numerical representation of any suitable number of dimensions, e.g., representing characteristics of the input image data.

At 806, the image data processing system may determine, using the trained machine learning model, respective pixel representations of the input image data for each of the plurality of layers of the 3D display. For example, the machine learning model (e.g., model 201 of FIG. 2) may comprise a deformable feature extraction block 302 of FIG. 3 and/or a residual learning block 303 of FIG. 3 and/or any other suitable blocks (e.g., comprising one or more layers and/or one or more groups of layers and/or other components). The model may be trained to learn features and patterns with respect to characteristics of a particular input SAI and corresponding high-quality output layered representations of the input. The image data processing system may obtain and output from the trained machine learning model pixel representations for each layer of a plurality of layers of a 3D display on which the image data is to be displayed. The image data processing system may determine, receive and/or request information from the display indicative of a type of the display (e.g., indicating that the display is a tensor multi-layer display and/or indicating a number of layers of the display and/or any other suitable characteristics). Such information may be employed by the model to tailor the output pixel representation to the particular type of display indicated in the information and/or number of layers indicated.

At 808, the image data processing system may encode the respective pixel representations of the input image data output by the machine learning model. For example, the image data processing system may apply, or otherwise transmit the output data to a tool configured to apply, VVC intra coding to the respective pixel representations of the input image data determined by the trained machine learning model. Additionally or alternatively, any other suitable encoding and/or compression techniques may be employed.

At 810, the image data processing system may transmit, for display at the 3D display (e.g., 3D display 100 of FIG. 1), the encoded respective pixel representations of the input image data. In some embodiments, such transmission may occur over any suitable network or networks and/or within a same network. In some embodiments, the encoded respective pixel representations may be stored by the image data processing system. The receiving 3D display device may be configured to perform decoding of the received image data and generate for display such data to a user, to facilitate an immersive LF display experience. In some embodiments, the image data may be part of a media asset (e.g., a movie or image or any other suitable content) and the image data processing system may perform the processing described in FIG. 8 for each frame of the media asset.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   training a machine learning model to:
   accept as input synthetic aperture image (SAI) training data for a three-dimensional (3D) display, the 3D display comprising a plurality of layers; and
   output respective pixel representations of the SAI training data for each of the plurality of layers of the 3D display;
   inputting image data to the trained machine learning model;
   determining, using the trained machine learning model, respective pixel representations of the input image data for each of the plurality of layers of the 3D display;
   encoding, at one or more servers, the respective pixel representations of the input image data, wherein the encoding comprises compressing the respective pixel representations of the input image data; and
   transmitting, by the one or more servers to the 3D display over a communications network, the encoded respective pixel representations of the input image data, wherein the 3D display decodes the encoded respective pixel representations of the input image data and displays content based on the decoding.

2. The method of claim 1, wherein:
the 3D display is a light field (LF) tensor display, and
the SAI training data comprises LF information and represents respective view angles of a plurality of view angles of a frame of a media asset.

3. The method of claim 1, wherein training the machine learning model further comprises:
obtaining, using a least-squares solver, an initial estimate for the respective pixel representations for each of the plurality of layers;
determining a loss function based on the initial estimate; and
adjusting one or more parameters of the machine learning model to minimize the loss function.

4. The method of claim 1, wherein the machine learning model is a deep learning deformable SAI feature embedding network comprising:
a deformable feature extraction block comprising a deformable convolution layer and a deformable layer; and
a residual learning block.

5. The method of claim 4, wherein training the machine learning model further comprises:
causing the machine learning model to learn, using the deformable convolution layer and for each feature map of a plurality of feature maps representing characteristics of respective pixels of the SAI training data, filter weights for a filter and an offset mask for the filter.

6. The method of claim 5, wherein the learned offset mask enables flexible selection of input feature map pixels.

7. The method of claim 5, wherein the filter is configured to be slid around, and convolved with, pixels of the SAI training data at a plurality of sampling positions, and the offset mask is configured to deform the plurality of sampling positions.

8. The method of claim 7, wherein the offset mask is fractional, and the deformable convolution layer is configured to perform bilinear interpolation to estimate pixel values of the deformed sampling positions.

9. The method of claim 1, wherein:
a second layer of the 3D display is disposed between a first layer of the 3D display and a third layer of the 3D display, and is spaced apart from the first layer and the third layer;
the first layer is disposed between a backlight of the 3D display and the second layer, and is spaced apart from the backlight and the second layer; and
a distance between the third layer and the backlight is greater than a distance between the second layer and the backlight, and the distance between the second layer and the backlight is greater than a distance between the first layer and the backlight.

10. The method of claim 1, wherein the encoding further comprises:
applying versatile vide coding (VVC) intra coding to the respective pixel representations of the input image data determined by the trained machine learning model.

11. A computer-implemented system comprising:
input/output (I/O) circuitry; and
control circuitry configured to:
train a machine learning model to:
accept as input synthetic aperture image (SAI) training data for a three-dimensional (3D) display, the 3D display comprising a plurality of layers; and
output respective pixel representations of the SAI training data for each of the plurality of layers of the 3D display;
input image data to the trained machine learning model, wherein the image data is accessed via the I/O circuitry;
determine, using the trained machine learning model, respective pixel representations of the input image data for each of the plurality of layers of the 3D display;
encode, at one or more servers, the respective pixel representations of the input image data, wherein the encoding comprises compressing the respective pixel representations of the input image data; and
transmit, by the one or more servers to the 3D display over a communications network, the encoded respective pixel representations of the input image data, wherein the 3D display decodes the encoded respective pixel representations of the input image data and displays content based on the decoding.

12. The system of claim 11, wherein:
the 3D display is a light field (LF) tensor display, and
the SAI training data comprises LF information and represents respective view angles of a plurality of view angles of a frame of a media asset.

13. The system of claim 11, wherein the control circuitry is configured to train the machine learning model by:
obtaining, using a least-squares solver, an initial estimate for the respective pixel representations for each of the plurality of layers;
determining a loss function based on the initial estimate; and
adjusting one or more parameters of the machine learning model to minimize the loss function.

14. The system of claim 11, wherein the machine learning model is a deep learning deformable SAI feature embedding network comprising:
a deformable feature extraction block comprising a deformable convolution layer and a deformable layer; and
a residual learning block.

15. The system of claim 14, wherein the control circuitry is configured to train the machine learning model further by:
causing the machine learning model to learn, using the deformable convolution layer and for each feature map of a plurality of feature maps representing characteristics of respective pixels of the SAI training data, filter weights for a filter and an offset mask for the filter.

16. The system of claim 15, wherein the learned offset mask enables flexible selection of input feature map pixels.

17. The system of claim 15, wherein the control circuitry is configured to cause the filter to be slid around, and convolved with, pixels of the SAI training data at a plurality of sampling positions, and the control circuitry is configured to cause the offset mask to deform the plurality of sampling positions.

18. The system of claim 17, wherein the offset mask is fractional, and the control circuitry is configured to cause the deformable convolution layer to perform bilinear interpolation to estimate pixel values of the deformed sampling positions.

19. The system of claim 11, wherein:
a second layer of the 3D display is disposed between a first layer of the 3D display and a third layer of the 3D display, and is spaced apart from the first layer and the third layer, the first layer is disposed between a backlight of the 3D display and the second layer, and is spaced apart from the backlight and the second layer, and a distance between the third layer and the backlight is greater than a distance between the second layer and the backlight, and the distance between the second layer and the backlight is greater than a distance between the first layer and the backlight.

20. The system of claim 11, wherein the encoding further comprises:

applying versatile vide coding (VVC) intra coding to the respective pixel representations of the input image data determined by the trained machine learning model.

\* \* \* \* \*